US012030753B2

(12) United States Patent
Corn

(10) Patent No.: US 12,030,753 B2
(45) Date of Patent: Jul. 9, 2024

(54) BRIDGE CRANE ASSEMBLY

(71) Applicant: Roy Corn, Garden Grove, CA (US)

(72) Inventor: Roy Corn, Garden Grove, CA (US)

( * ) Notice: Subject to any disclaimer, the term of this patent is extended or adjusted under 35 U.S.C. 154(b) by 120 days.

(21) Appl. No.: 17/944,826

(22) Filed: Sep. 14, 2022

(65) Prior Publication Data

US 2024/0083718 A1 Mar. 14, 2024

(51) Int. Cl.

| | |
|---|---|
| ***B66C 17/00*** | (2006.01) |
| ***B66C 7/08*** | (2006.01) |
| ***B66C 9/14*** | (2006.01) |
| ***B66C 11/14*** | (2006.01) |
| ***B66C 13/22*** | (2006.01) |

(52) U.S. Cl.

CPC ................ *B66C 17/00* (2013.01); *B66C 7/08* (2013.01); *B66C 9/14* (2013.01); *B66C 11/14* (2013.01); *B66C 13/22* (2013.01)

(58) Field of Classification Search

CPC ........... B66C 17/00; B66C 17/06; B66C 7/02; B66C 7/08; B66C 9/02; B66C 9/14; B66C 9/16; B66C 11/14; B66C 13/00; B66C 13/18; B66C 13/22; B66C 2700/01; B66C 2700/012; B66C 2700/018; B66C 2700/0328; B66C 2700/082

USPC .......................................................... 212/312

See application file for complete search history.

(56) References Cited

U.S. PATENT DOCUMENTS

| | | | | | |
|---|---|---|---|---|---|
| 718,676 | A * | 1/1903 | Taylor | B66C 7/00 | 212/312 |
| 903,850 | A * | 11/1908 | Fenney | B60B 33/08 | 16/26 |
| 1,622,574 | A * | 3/1927 | Deady | B66C 7/00 | 105/163.1 |
| 1,858,929 | A * | 5/1932 | Harry | B66C 9/16 | 295/31.1 |
| 2,392,417 | A * | 1/1946 | Spafford | B66C 13/30 | 104/48 |
| 3,604,743 | A * | 9/1971 | Kinkopf | B66C 7/00 | 294/81.21 |
| 3,843,995 | A * | 10/1974 | Merrill | B60B 33/08 | 16/105 |

(Continued)

FOREIGN PATENT DOCUMENTS

| | | | | |
|---|---|---|---|---|
| BE | 896656 A * | 9/1983 | | B66C 9/14 |
| CN | 104649161 A * | 5/2015 | | |

(Continued)

*Primary Examiner* — Michael R Mansen
*Assistant Examiner* — Henrix Soto

(57) ABSTRACT

A bridge crane assembly includes a crane track that is positioned in a warehouse. A cylinder is included that has a plurality of tracks integrated into the cylinder. A drive unit is integrated into the cylinder and the drive unit has a pair of drive wheels that each engages the crane track. The drive unit rotates each of the drive wheels in a first direction or a second direction. A carriage extends around the cylinder and a plurality of rollers is each rotatably coupled to the carriage. Each of the rollers engages a respective one of the tracks on the cylinder thereby facilitating the carriage to travel along the cylinder. A transport unit is integrated into the carriage and the transport unit engages the cylinder. The transport unit is actuatable to urge the carriage to travel along the cylinder in either a primary direction or a secondary direction.

12 Claims, 3 Drawing Sheets

(56) References Cited

U.S. PATENT DOCUMENTS

| | | | | | |
|---|---|---|---|---|---|
| 4,516,446 | A | * | 5/1985 | Flohn | B21F 23/00 82/163 |
| 4,572,383 | A | | 2/1986 | Mori | |
| 5,603,420 | A | | 2/1997 | Swanson | |
| 6,021,911 | A | | 2/2000 | Glickman | |
| 6,827,334 | B2 | | 12/2004 | Volle | |
| 7,255,330 | B2 | | 8/2007 | Lutter | |
| 10,358,323 | B2 | * | 7/2019 | Russell | B61B 3/02 |
| 10,793,399 | B2 | | 10/2020 | Lawrence | |

FOREIGN PATENT DOCUMENTS

| | | | | | |
|---|---|---|---|---|---|
| CN | 109019321 | A | * | 12/2018 | B66C 7/08 |
| CN | 110194418 | A | * | 9/2019 | B66C 11/16 |
| CN | 112374389 | A | * | 2/2021 | B66C 11/04 |
| CN | 113233340 | A | * | 8/2021 | B66C 1/025 |
| DE | 102014114400 | A1 | * | 4/2016 | B66C 15/00 |
| SE | 460043 | B | * | 9/1989 | B61B 13/12 |
| WO | WO2011015496 | | | 2/2011 | |

* cited by examiner

BRIDGE CRANE ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to crane devices and more particularly pertains to a new crane device for transporting cargo in a warehouse setting. The device includes a crane track, a cylinder that extends across the crane track and a drive unit that is integrated into the cylinder and which engages the crane track for transporting the cylinder along the crane track. The device includes a carriage that extends around the cylinder and a transport unit attached to the carriage for urging the carriage to travel laterally along the cylinder. A winch is attached to the carriage for lifting and transporting cargo.

(2) Description of Related Art Including Information Disclosed Under 37 CFR 1.97 and 1.98

The prior art relates to crane devices including a track crane that includes a support beam extending across a crane track, a carriage that rolls along the support beam and a pair of drums rotatably integrated into the carriage. The prior art discloses a gantry crane device that includes a gantry, a beam that travels along the gantry and a drum rotatably integrated into the beam. The prior art discloses a lifting winch for an overhead crane that includes a pair of drums and a pulley system. The prior art discloses an adjustable block device for a bridge crane that includes a rotating drum.

(h) BRIEF SUMMARY OF THE INVENTION

An embodiment of the disclosure meets the needs presented above by generally comprising a crane track that is positioned in a warehouse. A cylinder is included that has a plurality of tracks integrated into the cylinder. A drive unit is integrated into the cylinder and the drive unit has a pair of drive wheels that each engages the crane track. The drive unit rotates each of the drive wheels in a first direction or a second direction. A carriage extends around the cylinder and a plurality of rollers is each rotatably coupled to the carriage. Each of the rollers engages a respective one of the tracks on the cylinder thereby facilitating the carriage to travel along the cylinder. A transport unit is integrated into the carriage and the transport unit engages the cylinder. The transport unit is actuatable to urge the carriage to travel along the cylinder in either a primary direction or a secondary direction.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
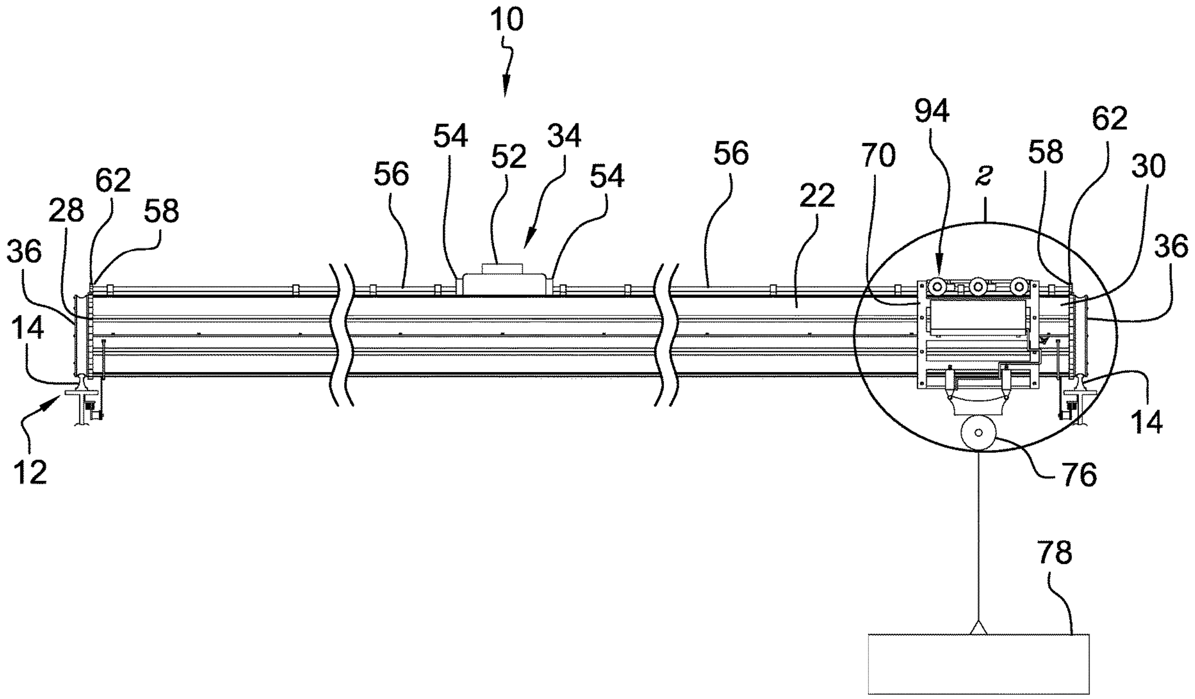
FIG. 1 is a front view of a bridge crane assembly according to an embodiment of the disclosure.
Figure 2:
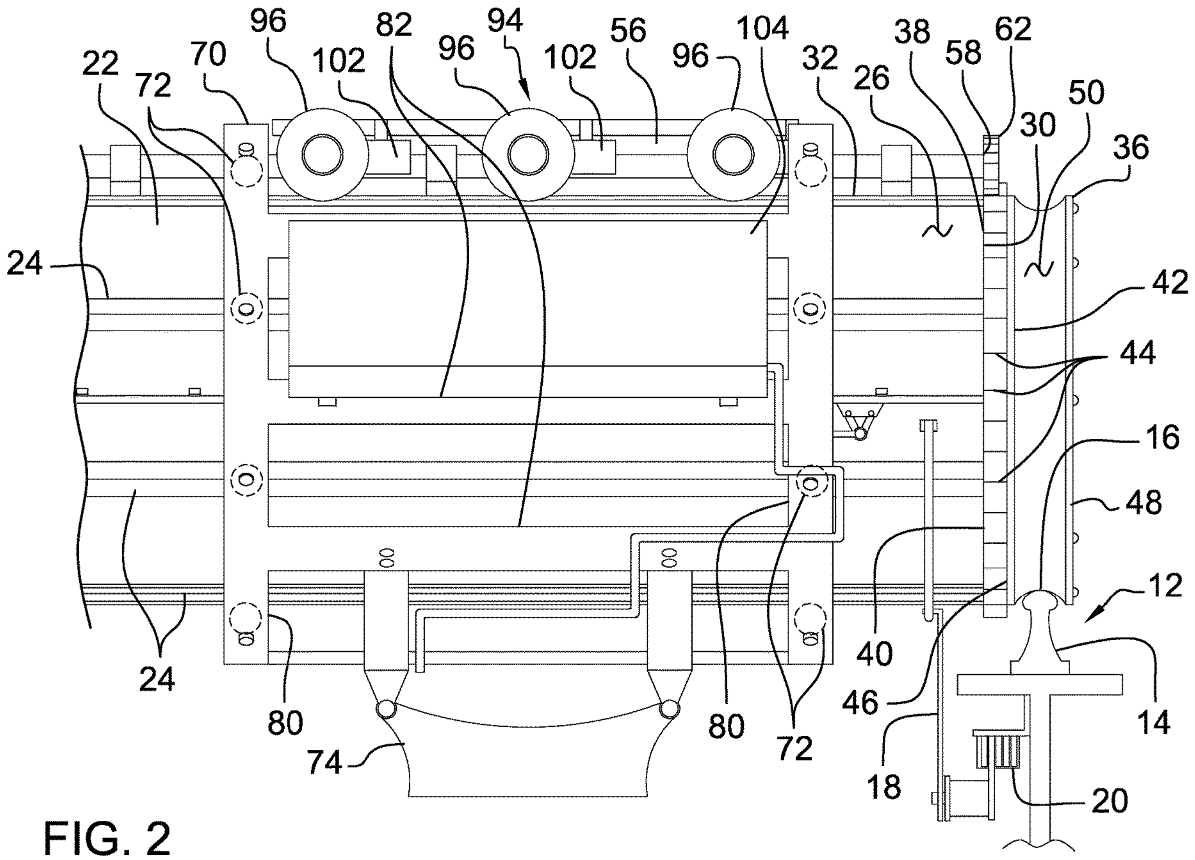
FIG. 2 is a zoomed detail view taken from circle 2 of FIG. 1 of an embodiment of the disclosure.
Figure 3:
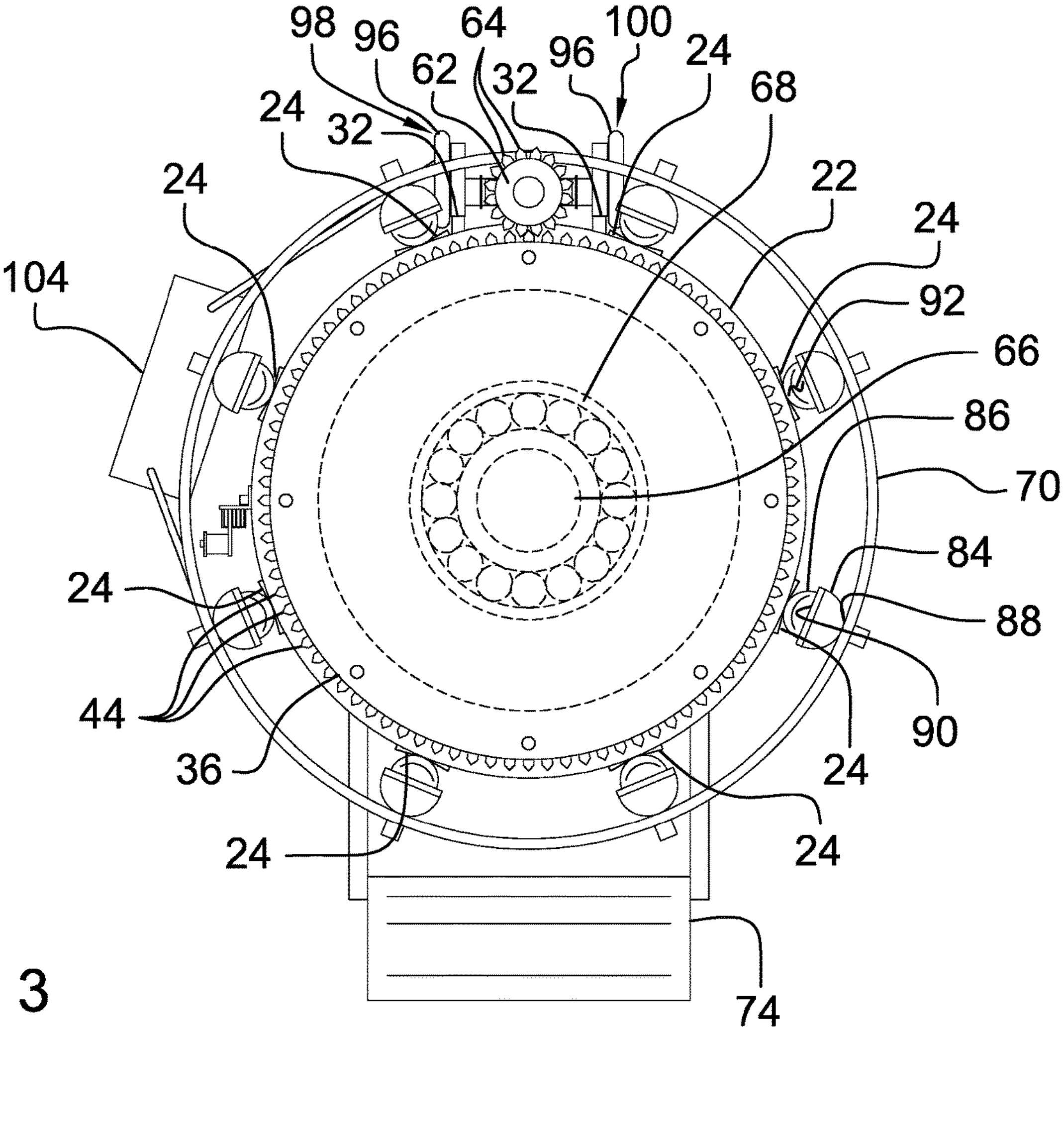
FIG. 3 is a right side phantom view of an embodiment of the disclosure.

With reference now to the drawings, and in particular to FIGS. 1 through 3 thereof, a new crane device embodying the principles and concepts of an embodiment of the disclosure and generally designated by the reference numeral 10 will be described.

As best illustrated in FIGS. 1 through 3, the bridge crane assembly 10 generally comprises a crane track 12 that is positioned in a warehouse setting or an industrial setting. The crane track 12 includes a pair of girders 14 that is each at an elevated height and the pair of girders 14 are spaced apart from each other and are oriented parallel with each other. Each of the girders 14 has a top surface 16 and the top surface 16 of each of the girders 14 is curved. Additionally, the crane track 12 has a power element 18 extending along a respective one of the girders 14 and the power element 18 is electrically coupled to a power source 20 comprising an electrical system of the warehouse. The crane track 12 may be a crane track of any conventional design that is commonly employed with bridge cranes.

A cylinder 22 is provided and a plurality of tracks 24 is integrated into the cylinder 22. The tracks 24 extend along a full length of the cylinder 22 and each of the tracks 24 is integrated into an outer surface 26 of the cylinder 22. Each of the tracks 24 is concavely arcuate with respect to the outer surface 26 and each of the tracks 24 extends between a first end 28 and a second end 30 of the cylinder 22. Furthermore, the tracks 24 are evenly spaced apart from each other and are distributed around a full circumference of the outer surface of the cylinder 22. A pair of rails 32 is each attached to the outer surface of the cylinder 22. Each of the rails 32 extends between the first end 28 and the second end 30 of the cylinder 22 and the rails 32 are spaced a fixed distance apart from each other. The cylinder 22 may be comprised of a rigid material, including but not being limited to steel, and the cylinder 22 may have a weight capacity of at least 9000.0 kg.

A drive unit 34 is integrated into the cylinder 22 and the drive unit 34 has a pair of drive wheels 36 that each engages a respective one of the girders 14 of the crane track 12 such that the cylinder 22 extends between the pair of girders 14. The drive unit 34 rotates each of the drive wheels 36 in a first direction or a second direction. The cylinder 22 travels in a first direction along the girders 14 when the drive unit 34 rotates the drive wheels 36 in the first direction. Conversely, the cylinder 22 travels in a second direction along the girders 14 when the drive unit 34 rotates the drive wheels 36 in the second direction.

The drive unit 34 comprises a pair of primary gears 38 that each has a first surface 40, a second surface 42 and a plurality of teeth 44 extending between the first surface 40 and the second surface 42. The first surface 40 of each of the primary gears 38 is rotatably coupled to a respective one of the first end 28 and the second end 30 of the cylinder 22. Each of the drive wheels 36 has a primary surface 46, a secondary surface 48 and an exterior surface 50 extending between the primary surface 46 and the secondary surface 48 and the exterior surface 50 is concavely arcuate between the primary surface 46 and the secondary surface 48. The primary surface 46 of each of the drive wheels 36 is coupled to the second surface 42 of a respective one of the primary gears 38. Additionally, the exterior surface 50 of each of the drive wheels 36 rests on the top surface 16 of the respective girder 14 having the exterior surface 50 conforming to curvature of the top surface 16 of the respective girder 14.

The drive unit 34 includes a drive motor 52 that is coupled to the cylinder 22. The drive motor 52 has a pair of outputs 54 and the drive motor 52 rotating in either a first direction or a second direction when the drive motor 52 is turned on. The drive motor 52 may comprise a two-direction electric motor or the like. The drive unit 34 includes a pair of drive shafts 56 that is each coupled to a respective one of the outputs 54 on the drive motor 52. Each of the drive shafts 56 has a distal end 58 with respect to the drive motor 52 and the distal end 58 of each of the drive shafts 56 is positioned adjacent to a respective one of the first end 28 and the second end 30 of the cylinder 22. Additionally, each of the drive shafts 56 may extend through a plurality of shaft bearings that are attached to the cylinder 22.

The drive unit 34 includes a pair of secondary gears 62 that is each attached to the distal end 58 of a respective one of the drive shafts 56. Each of the secondary gears 62 includes a plurality of teeth 64 and the teeth 64 on each of the secondary gears 62 enmeshes with the teeth 44 on a respective one of the primary gears 38. Each of the drive wheels 36 rolls along the respective girder 14 in the first direction the when drive motor 52 is turned on to rotate in the first direction thereby urging the cylinder 22 along the girders 14 in the first direction. Conversely, each of the drive wheels 36 rolls along the respective girder 14 in the second direction when the drive motor 52 is turned on to rotate in the second direction thereby urging the cylinder 22 along the girders 14 in the second direction. As is most clearly shown in FIG. 3, a shaft 66 may extend through the cylinder 22 and has been changed to "each of the primary gears 38 may be coupled to opposing ends of the shaft 66". Furthermore, a bearing 68 may be positioned around each of the opposing ends of the shaft 66.

A carriage 70 is provided and the carriage 70 extends around the cylinder 22. The carriage 70 has a plurality of rollers 72 that is each rotatably coupled to the carriage 70. Each of the rollers 72 engages a respective one of the tracks 24 on the cylinder 22 thereby facilitating the carriage 70 to travel along the cylinder 22. The carriage 70 has an attachment element 74 that is attachable to a winch 76 for lifting cargo 78 thereby facilitating the carriage 70 and the drive unit 34 to transport the cargo 78 to various locations in the warehouse. The carriage 70 comprises a pair of rings 80 and a plurality of members 82 extending between the rings 80 such that each of the rings 80 lies on a plane that is perpendicularly oriented with respect to each other. The members 82 are evenly spaced apart from each other and are distributed around the rings 80 and each of the rings 80 extends around the cylinder 22.

Each of the rollers 72 comprises a cup 84 and a ball 86 that is disposed in the cup 84. The cup 84 associated with each of the rollers 72 is coupled to an inwardly facing surface 88 of a respective one of the rings 80 and the cup 84 associated with each of the rollers 72 is aligned with a respective one of the tracks 24 on the cylinder 22. Additionally, an open end 90 of the cup 84 is directed toward the respective track 24 and the ball 86 associated with each of the rollers 72 is positioned in the respective track 24 such that an outer surface 92 of the ball 86 conforms to curvature of the respective track 24. In this way the ball 86 associated with each of the rollers 72 is inhibited from exiting the respective track 24 when the ball 86 associated with each of the rollers 72 rolls along the respective track 24.

A transport unit 94 is integrated into the carriage 70 and the transport unit 94 engages the cylinder 22. The transport unit 94 is actuatable to urge the carriage 70 to travel along the cylinder 22 in either a primary direction or a secondary direction. The transport unit 94 comprises a plurality of carriage wheels 96 and each of the carriage wheels 96 is rotatably coupled to a respective one of the members 82 of the carriage 70. The carriage wheels 96 are spaced apart from each other and are distributed between the pair of rings 80.

The plurality of carriage wheels 96 includes a set of first carriage wheels 98 and a set of second carriage wheels 100. Each of the first carriage wheels 98 engages a respective one of the rails 32 on the cylinder 22 and each of the second carriage wheels 100 engages a respective one of the rails 32 on the cylinder 22. The transport unit 94 includes a plurality of carriage motors 102 that is each rotatably coupled to a respective one of the carriage wheels 96. Each of the carriage motors 102 rotates in a first direction or a second direction. The carriage 70 is urged to travel in the primary direction along the cylinder 22 when the carriage motors 102 rotate in the first direction. Conversely, the carriage 70 is urged to travel in the secondary direction along the cylinder 22 when the carriage motors 102 rotate in the second direction.

A control unit 104 is coupled to the carriage 70 and the control unit 104 is in electrical communication with the power element 18 on the crane track 12. The control unit 104 is electrically coupled to the drive motor 52 and the control unit 104 is electrically coupled to each of the carriage motors 102. The control unit 104 may be electrically coupled to a remote control for remotely controlling the drive motor 52 and each of the carriage motors 102.

In use, the drive unit 34 drives the cylinder 22 forwardly or rearwardly along the crane track 12 and the transport unit 94 drives the carriage 70 laterally along the cylinder 22. In this way the winch 76 that is attached to the carriage 70 can be positioned at any location in the warehouse setting or industrial setting. Furthermore, the winch 76 can lift and subsequently transport the cargo 78 to any location in the warehouse setting or industrial setting. The secondary gears 62 and the drive wheels 36 facilitate the cylinder 22 to be driven along the crane track 12 by rotation thereby producing smoother travel and better load bearing capabilities compared to currently existing bridge cranes.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bridge crane assembly for facilitating cargo to be transported in a warehouse environment, said assembly comprising:

a crane track being positioned in a warehouse, said crane track including a pair of girders each being at an elevated height, said pair of girders being spaced apart from each other and being oriented parallel with each other;

a cylinder having a plurality of tracks being integrated into said cylinder, said tracks extending along a full length of said cylinder;

a drive unit being integrated into said cylinder, said drive unit having a pair of drive wheels each engaging a respective one of said girders of said crane track such that said cylinder extends between said pair of girders, said drive unit rotating each of said drive wheels in a first direction or a second direction, said cylinder travelling in a first direction along said girders when said drive unit rotates said drive wheels in said first direction, said cylinder travelling in a second direction along said girders when said drive unit rotates said drive wheels in said second direction;

a carriage extending around said cylinder, said carriage having a plurality of rollers each being rotatably coupled to said carriage, each of said rollers engaging a respective one of said tracks on said cylinder thereby facilitating said carriage to travel along said cylinder, said carriage having an attachment element being attachable to a winch for lifting cargo thereby facilitating said carriage and said drive unit to transport the cargo to various locations in the warehouse; and a transport unit being integrated into said carriage, said transport unit engaging said cylinder, said transport unit being actuatable to urge said carriage to travel along said cylinder in either a primary direction or a secondary direction.

2. The assembly according to claim 1, wherein:

each of said tracks is integrated into an outer surface of said cylinder, each of said tracks being concavely arcuate with respect to said outer surface, each of said tracks extending between a first end and a second end of said cylinder, said tracks being evenly spaced apart from each other and being distributed around a full circumference of said outer surface of said cylinder; and said cylinder has a pair of rails each being attached to said outer surface of said cylinder, each of said rails extending between said first end and said second end of said cylinder, said rails being spaced a fixed distance apart from each other.

3. The assembly according to claim 2, wherein:

each of said girders has a top surface, said top surface of each of said girders being curved;

said drive unit comprises a pair of primary gears, each of said primary gears having a first surface, a second surface and a plurality of teeth extending between said first surface and said second surface, said first surface of each of said primary gears being rotatably coupled to a respective one of said first end and said second end of said cylinder; and each of said drive wheels has a primary surface, a secondary surface and an exterior surface extending between said primary surface and said secondary surface, said exterior surface being concavely arcuate between said primary surface and said secondary surface, said primary surface of each of said drive wheels being coupled to said second surface of a respective one of said primary gears, said exterior surface of each of said drive wheels resting on said top surface of said respective girder having said exterior surface conforming to curvature of said top surface of said respective girder.

4. The assembly according to claim 3, wherein said drive unit includes a drive motor being coupled to said cylinder, said drive motor having a pair of outputs, said drive motor rotating in either a first direction or a second direction when said drive motor is turned on.

5. The assembly according to claim 4, wherein said drive unit includes a pair of drive shafts, each of said drive shafts being coupled to a respective one of said outputs on said drive motor, each of said drive shafts having a distal end with respect to said drive motor, said distal end of each of said drive shafts being positioned adjacent to a respective one of said first end and said second end of said cylinder.

6. The assembly according to claim 5, wherein:

said drive unit includes a pair of secondary gears, each of said secondary gears being attached to said distal end of a respective one of said drive shafts, each of said secondary gears including a plurality of teeth, said teeth on each of said secondary gears enmeshing with said teeth on a respective one of said primary gears;

each of said drive wheels rolls along said respective girder in said first direction when said drive motor is turned on to rotate in said first direction thereby urging said cylinder along said girders in said first direction; and each of said drive wheels rolls along said respective girder in said second direction when said drive motor is turned on to rotate in said second direction thereby urging said cylinder along said girders in said second direction.

7. The assembly according to claim 2, wherein said carriage comprises a pair of rings and a plurality of members extending between said rings such that each of said rings lies on a plane being perpendicularly oriented with respect to each other, said members being evenly spaced apart from each other and being distributed around said rings, each of said rings extending around said cylinder having each of said members being spaced from said outer surface of said cylinder.

8. The assembly according to claim 7, wherein:

each of said rollers comprises a cup and a ball being disposed in said cup, said cup associated with each of said rollers being coupled to an inwardly facing surface of a respective one of said rings, said cup associated with each of said rollers being aligned with a respective one of said tracks on said cylinder; and said ball associated with each of said rollers is positioned in said respective track such that an outer surface of said ball conforms to curvature of said respective track, said ball associated with each of said rollers rolling along said respective track.

9. The assembly according to claim 7, wherein said transport unit comprises a plurality of carriage wheels, each of said carriage wheels being rotatably coupled to a respective one of said members of said carriage, said carriage wheels being spaced apart from each other and being distributed between said pair of rings, said plurality of carriage wheels including a set of first carriage wheels and a set of second carriage wheels, each of said first carriage wheels engaging a respective one of said rails on said cylinder, each of said second carriage wheels engaging a respective one of said rails on said cylinder.

10. The assembly according to claim 9, wherein said transport unit comprises a plurality of carriage motors, each of said carriage motors being rotatably coupled to a respective one of said carriage wheels, each of said carriage motors rotating in a first direction or a second direction, said carriage being urged to travel in said primary direction along said cylinder when said carriage motors rotate in said first direction, said carriage being urged to travel in said secondary direction along said cylinder when said carriage motors rotate in said second direction.

11. The assembly according to claim 1, wherein:

said crane track has a power element extending along a respective one of said girders;

said drive unit includes a drive motor;

said transport unit includes a plurality of carriage motors; and said assembly includes a control unit being coupled to said carriage, said control unit being in electrical communication with said power element on said crane track, said control unit being electrically coupled to said drive motor, said control unit being electrically coupled to each of said carriage motors.

12. A bridge crane assembly for facilitating cargo to be transported in a warehouse environment, said assembly comprising:

a crane track being positioned in a warehouse, said crane track including a pair of girders each being at an elevated height, said pair of girders being spaced apart from each other and being oriented parallel with each other, each of said girders having a top surface, said top surface of each of said girders being curved, said crane track having a power element extending along a respective one of said girders;

a cylinder having a plurality of tracks being integrated into said cylinder, said tracks extending along a full length of said cylinder, each of said tracks being integrated into an outer surface of said cylinder, each of said tracks being concavely arcuate with respect to said outer surface, each of said tracks extending between a first end and a second end of said cylinder, said tracks being evenly spaced apart from each other and being distributed around a full circumference of said outer surface of said cylinder, said cylinder having a pair of rails each being attached to said outer surface of said cylinder, each of said rails extending between said first end and said second end of said cylinder, said rails being spaced a fixed distance apart from each other;

a drive unit being integrated into said cylinder, said drive unit having a pair of drive wheels each engaging said a respective one of said girders of said crane track such that said cylinder extends between said pair of girders, said drive unit rotating each of said drive wheels in a first direction or a second direction, said cylinder travelling in a first direction along said girders when said drive unit rotates said drive wheels in said first direction, said cylinder travelling in a second direction along said girders when said drive unit rotates said drive wheels in said second direction, said drive unit comprising:

a pair of primary gears, each of said primary gears having a first surface, a second surface and a plurality of teeth extending between said first surface and said second surface, said first surface of each of said primary gears being rotatably coupled to a respective one of said first end and said second end of said cylinder, each of said drive wheels having a primary surface, a secondary surface and an exterior surface extending between said primary surface and said secondary surface, said exterior surface being concavely arcuate between said primary surface and said secondary surface, said primary surface of each of said drive wheels being coupled to said second surface of a respective one of said primary gears, said exterior surface of each of said drive wheels resting on said top surface of said respective girder having said exterior surface conforming to curvature of said top surface of said respective girder;

a drive motor being coupled to said cylinder, said drive motor having a pair of outputs, said drive motor rotating in either a first direction or a second direction when said drive motor is turned on;

a pair of drive shafts, each of said drive shafts being coupled to a respective one of said outputs on said drive motor, each of said drive shafts having a distal end with respect to said drive motor, said distal end of each of said drive shafts being positioned adjacent to a respective one of said first end and said second end of said cylinder;

a pair of secondary gears, each of said secondary gears being attached to said distal end of a respective one of said drive shafts, each of said secondary gears including a plurality of teeth, said teeth on each of said secondary gears enmeshing with said teeth on a respective one of said primary gears, each of said drive wheels rolling along said respective girder in said first direction when said drive motor is turned on to rotate in said first direction thereby urging said cylinder along said girders in said first direction, each of said drive wheels rolling along said respective girder in said second direction when said drive motor is turned on to rotate in said second direction thereby urging said cylinder along said girders in said second direction;

a carriage extending around said cylinder, said carriage having a plurality of rollers each being rotatably coupled to said carriage, each of said rollers engaging a respective one of said tracks on said cylinder thereby facilitating said carriage to travel along said cylinder, said carriage having an attachment element being attachable to a winch for lifting cargo thereby facilitating said carriage and said drive unit to transport the cargo to various locations in the warehouse, said carriage comprising a pair of rings and a plurality of members extending between said rings such that each of said rings lies on a plane being perpendicularly oriented with respect to each other, said members being evenly spaced apart from each other and being distributed around said rings, each of said rings extending around said cylinder, each of said rollers comprising a cup and a ball being disposed in said cup, said cup associated with each of said rollers being coupled to an inwardly facing surface of a respective one of said rings, said cup associated with each of said rollers being aligned with a respective one of said tracks on said cylinder, said ball associated with each of said rollers being positioned in said respective track such that an outer surface of said ball conforms to curvature of said respective track, said ball associated with each of said rollers rolling along said respective track;

a transport unit being integrated into said carriage, said transport unit engaging said cylinder, said transport unit being actuatable to urge said carriage to travel along said cylinder in either a primary direction or a secondary direction, said transport unit comprising:

a plurality of carriage wheels, each of said carriage wheels being rotatably coupled to a respective one of said members of said carriage, said carriage wheels being spaced apart from each other and being distributed between said pair of rings, said plurality of carriage wheels including a set of first carriage wheels and a set of second carriage wheels, each of said first carriage wheels engaging a respective one of said rails on said cylinder, each of said second carriage wheels engaging a respective one of said rails on said cylinder; and a plurality of carriage motors, each of said carriage motors being rotatably coupled to a respective one of said carriage wheels, each of said carriage motors rotating in a first direction or a second direction, said carriage being urged to travel in said primary direction along said cylinder when said carriage motors rotate in said first direction, said carriage being urged to travel in said secondary direction along said cylinder when said carriage motors rotate in said second direction; and a control unit being coupled to said carriage, said control unit being in electrical communication with said power element on said crane track, said control unit being electrically coupled to said drive motor, said control unit being electrically coupled to each of said carriage motors.

* * * * *